United States Patent [19]

Hoover et al.

[11] Patent Number: 5,932,677

[45] Date of Patent: Aug. 3, 1999

[54] TERPOLYMER HAVING AROMATIC POLYESTER, POLYSILOXANE AND POLYCARBONATE SEGMENTS

[75] Inventors: James F. Hoover; Paul D. Sybert, both of Evansville, Ind.

[73] Assignee: General Electric Company, Pittsfield, Mass.

[21] Appl. No.: 08/068,445

[22] Filed: May 27, 1993

[51] Int. Cl.[6] .................................................. C08G 77/04
[52] U.S. Cl. ............................ 528/26; 525/446; 525/464; 528/29
[58] Field of Search ....................... 528/29, 26; 525/446, 525/464

[56] References Cited

U.S. PATENT DOCUMENTS

| | | | |
|---|---|---|---|
| 3,028,365 | 4/1962 | Schnell et al. | 528/196 |
| 3,030,331 | 4/1962 | Goldberg | 528/182 |
| 3,169,121 | 2/1965 | Goldberg | 528/173 |
| 3,189,662 | 6/1965 | Vaughn, Jr. | 528/33 |
| 3,275,601 | 9/1966 | Schnell et al. | 528/199 |
| 3,334,154 | 8/1967 | Kim | 525/469 |
| 3,419,634 | 12/1968 | Vaughn | 528/29 |
| 3,419,635 | 12/1968 | Vaughn, Jr. | 528/29 |
| 3,832,419 | 8/1974 | Merritt, Jr. | 528/21 |
| 3,915,926 | 10/1975 | Wambach | 524/411 |
| 4,188,314 | 2/1980 | Fox et al. | 524/494 |
| 4,681,922 | 7/1987 | Schmidt et al. | 525/474 |
| 4,994,532 | 2/1991 | Hawkins et al. | 525/464 |
| 5,025,074 | 6/1991 | Davis | 528/15 |

*Primary Examiner*—Robert Dawson

[57] ABSTRACT

Terpolymers suitable as molding resins are provided having aromatic polyester segments polycarbonate segments and polysiloxane segments of the structure

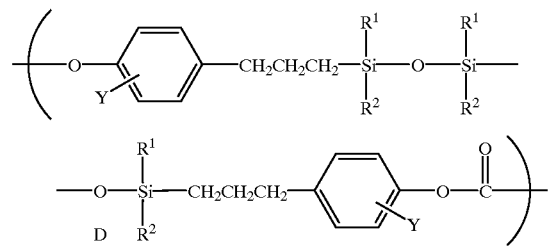

where $R^1$, $R^2$, Y and D are as defined herein, and where the weight percentage of polyester and polycarbonate segments is from 50 to 99%, preferably 92 to 96%, and the weight percentage of polysiloxane segments is from 50 to 1%, preferably from 8 to 4%. Also provided is a one-step process to prepare the new terpolymers by reacting together a siloxane, a bisphenol and an aromatic dicarboxylic acid halide.

12 Claims, No Drawings

TERPOLYMER HAVING AROMATIC POLYESTER, POLYSILOXANE AND POLYCARBONATE SEGMENTS

CROSS REFERENCE TO RELATED APPLICATION

This application is related to commonly assigned copending application Ser. No. 07/724,018, filed Jul. 1, 1991 under Attorney's Docket No. 8CL-6894.

FIELD OF THE INVENTION

This invention relates to thermoplastic condensation polymers which are terpolymers having aromatic polyester, polysiloxane and polycarbonate segments. These polymers exhibit non-Newtonian melt viscosities, advantageous low temperature properties and resistance to solvents, chemicals, hydrolysis and to photodecomposition. The terpolymers are especially useful as engineering thermoplastics.

BRIEF DESCRIPTION OF THE RELATED ART

Condensation copolymers having polysiloxane and polycarbonate blocks are known. Representative of such polymers are those disclosed by Schmidt et al., U.S. Pat. No. 4,681,922, Vaughn, U.S. Pat. No. 3,189,662, Vaughn, U.S. Pat. No. 3,419,635, and Merritt, U.S. Pat. No. 3,832,419. Some of these copolymers, while useful, have lower than desired flow properties, requiring high torque or high molding pressures during processing. From the standpoint of ease of processing, it is desirable for a thermoplastic to have higher melt flow properties. This makes possible rapid and complete mold filling and is especially important for molding complex and thinwalled articles.

Other siloxane-carbonate copolymers, such as described by Vaughn, U.S. Pat. No. 3,419,635, have an elastomeric character and are not considered as engineering thermoplastics, being more useful as adhesives, coatings, sealants, roofing material, impact modifying additives and the like.

Shortcomings of other siloxane-carbonate polymers are inadequate impact strength at low temperatures and inadequate resistance to distortion at elevated temperatures.

Another property which needs improvement beyond the levels achieved with the prior art copolymers is solvent resistance, as manifested for instance by resistance to crazing upon exposure to solvents, motor fuels, and the like.

A shortcoming of certain other known polycarbonate-siloxane copolymers is the presence of an aryloxysilicon linkage, which is hydrolysis prone.

In said copending application, Ser. No. 07/724,018, filed, Jul. 1, 1991, are disclosed condensation polymers which are terpolymers having aliphatic polyester, polysiloxane and polycarbonate segments (blocks). In comparison with the prior art, these polymers exhibit advantageous melt flows, advantageous low temperature properties and resistance to solvents, chemicals, and to hydrolysis.

It has now been discovered that, if such terpolymers are prepared, but instead of aliphatic polyester segments, aromatic polyester segments are employed, commercially important and unexpected additional advantages are obtained.

The new polymers of this invention are terpolymers having aromatic polyester, polysiloxane and polycarbonate segments (blocks). They exhibit unexpectedly advantageous non-Newtonian melt viscosity behavior and better low temperature ductility and thick section impact than the corresponding non-siloxane containing polyester carbonates.

These advantages are commercially significant because currently available high heat resistant resins are difficult to injection mold, but the decrease in viscosity under shearing conditions of the new resins makes it easier to fill molds to produce difficult to fill parts. Furthermore parts exposed to low temperatures, e.g. −30° C., made from the new resins maintain a high percentage of their ductility and are much less prone to failure when impacted.

A further advantageous feature of the invention from a process standpoint is the formation of the new segmented polymers in a convenient and novel one-step process which forms the aromatic polyester segment from an aromatic diacid halide, the carbonate segment from a bisphenol and links them with the polysiloxane segment. This is in contrast to processes for making block copolymers, where it is usually necessary to synthesize the individual blocks and to combine them in a separate step, thus imposing additional labor and time on the process.

SUMMARY OF THE INVENTION

The invention comprises a thermoplastic terpolymer, which comprises; (a) about 1 to about 50 weight percent of a repeating or recurring polysiloxane unit, based on the total weight of the terpolymer, of the formula:

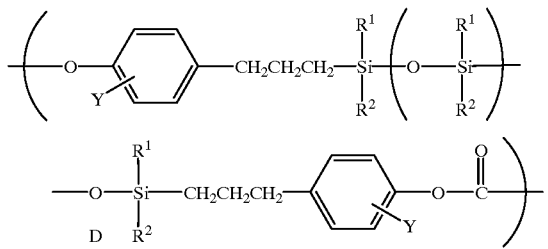

where $R^1$ and $R^2$ are each independently selected from hydrogen, hydrocarbyl, halogen-substituted hydrocarbyl ($R^1$ preferably is methyl and $R^2$ preferably is methyl or phenyl); D is the average block length and is from about 10 to about 120, preferably about 30–70, and more preferably 40–60; and Y is hydrogen, alkyl or alkoxy (and where alkoxy, preferably methoxy); and (b) about 99 to about 50% by weight of the terpolymer of a polycarbonate-aromatic polyester condensation copolymer consisting essentially of from about 80 to about 10% by weight, relative to the total weight of recurring units in (b), of polycarbonate units of the formula:

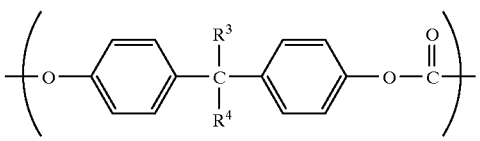

where R 3 and R 4 are each selected from hydrogen, hydrocarbyl or halogen-substituted hydrocarbyl, (preferably methyl); and from 20 to 90% by weight, relative to the total weight of the recurring units in (b), of aromatic diester units of the formula:

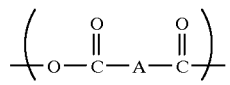

where A is phenylene, preferably iso-phenylene, terephenylene or a mixture thereof.

The term "hydrocarbyl" as used herein means the monovalent moiety obtained upon removal of a hydrogen atom from a parent hydrocarbon. Representative of hydrocarbyl are alkyl of 1 to 25 carbon atoms, inclusive such as methyl, ethyl, propyl, butyl, pentyl, hexyl, heptyl, octyl, nonyl, undecyl, decyl, dodecyl, octadecyl, nonodecyl eicosyl, heneicosyl, docosyl, tricosyl, tetracosyl, pentacosyl and the isomeric forms thereof; aryl of 6 to 25 carbon atoms, inclusive, such as phenyl, tolyl, xylyl, napthyl, biphenyl, tetraphenyl and the like; aralkyl of 7 to 25 carbon atoms, inclusive, such as benzyl, phenethyl, phenpropyl, phenbutyl, phenhexyl, napthoctyl and the like; cycloalkyl of 3 to 8 carbon atoms, inclusive, such as cyclopropyl, cyclobutyl, cyclopentyl, cyclohexyl, cycloheptyl, cyclooctyl and the like.

The term "phenylene" means the divalent moiety obtained on removal of two hydrogen atoms, each from a carbon atom of a benzene and includes phenylene of 6 carbon atoms such as 1,2-phenylene, 1,3-phenylene, 1,4-phenylene, mixtures of any of them and the like.

The term "halogen-substituted hydrocarbyl", as used herein means the hydrocarbyl moiety as previously defined wherein one or more hydrogen atoms have been replaced with a halogen atom.

The term "halogen" and "halide" are embracive of chlorine, bromine, iodine and fluorine; preferably chlorine and bromine.

DETAILED DESCRIPTION OF THE INVENTION

The following description presents embodiment compositions of the invention and the manner and process of conducting the process of the invention.

The process of this invention comprises reacting a carbonate precursor such as phosgene simultaneously with (1) a siloxane, terminated by phenolic hydroxyls, of the formula:

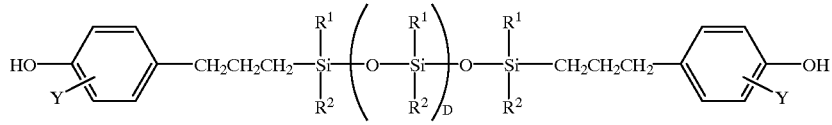

where $R^1$, $R^2$, D and Y are as defined above, (2) a bisphenol of the formula:

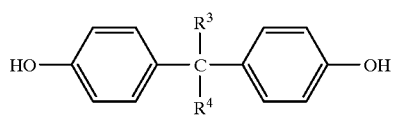

where $R^2$ and $R^4$ are as defined above; and (3) an aromatic dicarboxylic acid halide having the formula:

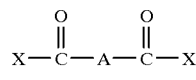

where A is phenylene and X is chloro or bromo; in the presence of sufficient aqueous alkali to maintain an alkaline pH and in the presence of a substantially water-immiscible solvent; the reactants (1), (2) and (3) being in the ratio required for the terpolymer structure described above.

The procedure is the well-known interfacial polymerization technique, used to prepare polycarbonate resins.

The method of preparation of polycarbonates by interfacial polymerization are well known; see for example the details provided in the U.S. Pat. Nos. 3,028,365; 3,334,154; 3,275,601; 3,915,926; 3,030,331; 3,169,121; and 4,188,314, all of which are incorporated herein by reference thereto.

Although the reaction conditions of the preparative processes may vary, several of the preferred processes typically involve dissolving or dispersing the bisphenol reactant in aqueous caustic soda or potash, adding the resulting mixture with the siloxane and the aromatic diacid halide to a suitable water immiscible solvent medium and contacting the reactants with the carbonate precursor, such as phosgene, in the presence of a suitable catalyst such as triethyl amine and under controlled pH conditions, e.g., 8–10. The most commonly used water immiscible solvents include methylene chloride, 1,2-dichloroethane, chlorobenzene, toluene, and the like.

A catalyst may be employed to accelerate the rate of polymerization of the dihydroxy phenol reactant with the carbonate precursor. Representative catalysts include but are not limited to tertiary amines such as triethylamine, quaternary phosphonium compounds, quaternary ammonium compounds, and the like. The preferred process for preparing resins of the invention comprises the phosgenation reaction. The temperature at which the phosgenation reaction proceeds may vary from below 0° C., to above 100° C. The phosgenation reaction preferably proceeds at temperatures of from room temperatures (25° C.) to 50° C. Since the reaction is exothermic, the rate of phosgene addition may be used to control the reaction temperature. The amount of phosgene required will generally depend upon the amount of the dihydric phenol reactant and the amount of aromatic dicarboxylic acid halide also present.

The process of the invention may be conducted without a chain limiting amount of a monohydric phenol chain stopper, but it is preferable that such an agent be present so that the molecular weight is controlled. Any monohydric phenol can be used, unsubstituted or with one or more substituents such as hydrocarbyl, hydrocarbyloxy or halogen, but the preferred monohydric phenols are phenol and p-cumyl phenol. The typical amount of monohydric phenol to result in the desired molecular weight (chain length) being in the desired range is about 0.5% to 5.0% by weight of bisphenol. The preferred end groups for the terpolymers of the invention are aryloxy groups, especially phenoxy, optionally substituted by one or more hydrocarbyl, hydrocarbyloxy, and/or halogen substituents. Preferred end-capping phenols are phenol, p-tertiary butyl phenol, p-cumyl phenol, and the like. Special mention is made of p-cumyl phenol.

The terpolymers of the invention comprise recurring segments of the Formulae as sot forth above.

Particularly preferred polysiloxane blocks are made from bisphenolpolysiloxanes, which may be prepared in accordance with the method described in U.S. Pat. No. 3,419,635. A preferred compound is readily provided by eugenol (2-methoxy-4-allylphenol) reacted to cap a hydrogen-terminated polysiloxane by an addition reaction advantageously catalyzed by platinum or its compounds. The essential features of the capping process are described by Vaughn, U.S. Pat. No. 3,419,635, which is incorporated by reference. For instance, the process is exemplified in example 8 of this Vaughn patent which describes the addition of a hydrogen-terminated polydimethylsiloxane to allylphenol in the presence of a catalytic amount of platinum catalyst at an elevated temperature.

The bisphenols of the above described formula are preferably used for the preparation of the polycarbonate segment of the terpolymer. Examples of preferred $R^3$ and $R^4$ groups are hydrogen, methyl, ethyl, n-propyl, isopropyl, octyl, eicosyl, vinyl, cyclohexyl, phenyl, trifluoromethyl, chlorophenyl, benzyl, and pentabromophenyl. The most preferred $R^3$ and $R^4$ groups are methyl, thus the most preferred bisphenol is bisphenol A. Representative of other bisphenol are those listed in U.S. Pat. No. 4,994,532 (col. 3, lines 33–55) which is incorporated herein by reference thereto.

The aromatic dicarboxylic acid halide is preferably iso-phenylene, tere-phenylene or a mixture thereof.

The amount of alkali to be used in the process of the invention is at least that amount needed to neutralize the hydrochloric acid stoichiometrically produced by the reaction of the phosgene and the aromatic dicarboxylic acid halide with the phenolic groups of the bisphenol and the phenolically-terminated siloxane, although an excess over this amount can be used. The alkali is conveniently an alkaline metal hydroxide, such as sodium, potassium or lithium hydroxide, although a soluble alkali carbonate can also be used. The preferred alkali is aqueous sodium hydroxide.

The process of the invention features the simultaneous formation and incorporation of the siloxane, the aromatic polyester and the polycarbonate segments into the terpolymer product.

The products can be recovered from the reaction mixture in known ways. For example, the organic layer can be separated, washed with aqueous acid and water until neutral, then steam treated to precipitate the terpolymer which is recovered and dried.

The terpolymers of the invention may be compounded with the addition of various types of additives known to the art of plastics compounding. Such additives can include for example fillers (such as clay or talc), reinforcing agents (such as glass fibers), impact modifiers, other resins, antistats, plasticizers, flow promoters and other processing aids, stabilizers, colorants, mold release agents, other flame retardants, ultraviolet screening agents, and the like. The thermoplastic of the invention can also be blended with other resins such as ABS and thermoplastic polyesters to produce useful thermoplastic blends.

DESCRIPTION OF THE PREFERRED EMBODIMENTS

The invention will be better understood with reference to the following examples, which are presented for purposes of illustration rather than for limitation, and set forth the best mode contemplated for carrying out the invention.

PREPARATION 1

Representative preparation of eugenol capped polydimethylsiloxane fluid;

Octamethylcyclotetrasiloxane (8.3 kg, 28.0 soles), tetramethyldisiloxane (330 g, 2.46 moles) and Filtrol 20 (86 g, 1% by weight, Harshaw/Filtrol Clay Products) were combined in a 12 L flask and heated to 45° C. for 2 hours. The temperature was raised to 100° C. and the mixture was rapidly agitated for 5 hours. The mixture was allowed to cool then filtered through a plug of Celite filtering aid. To the crude product was added a mixture of eugenol (774 g, 4.72 moles) and Karstedt's platinum catalyst (1.57 g, 10 ppm Pt) at a rate of 40 g/minute. Reaction completion was monitored by the disappearance of the siloxane hydrogen in the FTIR spectrum. The reaction product was stripped of volatiles using a falling thin film evaporator operating at 200° C. and 1.5 torr. The isolated material was a light brown oil with a viscosity of 100 cstokes at 25° C. and a degree of polymerization of 49 siloxane units. The material was used without further purification.

EXAMPLE 1

A polyester-polycarbonate-polysiloxane terpolymer, in accordance with the present invention, is prepared by charging a vessel with 150.0 g of the siloxane from Preparation 1, 1772.0 g of 2,2-bis-(4-hydroxyphenyl)propane (hereinafter BPA), 57.7 g of p-cumylphenol, 21.0 g of triethylamine (TEA) in methylene chloride and 6.0 liters of water. While the mixture is being stirred, 1165.0 g of a 93:7 isophthaloyl chloride:terephthaloyl chloride mixture dissolved in methylene chloride is added to the vessel. The total volume of methylene chloride in the vessel is 11 liters. During the addition of the diacid chloride mixture to the vessel, the pH is maintained between 8 and 10 by the addition of sodium hydroxide.

After the diacid chloride mixture is added, 240.0 g of phosgene is added to the vessel.

The organic layer is separated, washed with dilute hydrochloric acid, washed with water, steam precipitated and dried. The resulting polyester-polycarbonate-polysiloxane block terpolymer has 5% by weight siloxane, 80 weight percent eater units based on the total ester and carbonate units in the terpolymer and a resin molecular weight of 28,700.

The resulting product is compounded with a phosphite stabilizer (0.05 wt %) and tumbled in a stainless steel can prior to extrusion on a Werner and Pfleider 28 or 30 mm co-rotating twin screw extruder operating at 550 to 570° F. barrel temperature. Test specimens where prepared by injection molding at 570° F. melt temperature and 180° F. mold temperature. Notched IZOD impact of single gated bars is determined according to ASTM D-256. The heat distortion temperature (HDT) at 264 PSI and the apparent melt viscosities at 350° C. is also determined for the copolymer. The results are reported in Table 1.

EXAMPLE 2

A polyester-polycarbonate-polysiloxane terpolymer, in accordance with the present invention, is prepared by charging a vessel with 150.0 g of the siloxane from Preparation 1, 1772.0 g of BPA, 57.7 g of p-cumylphenol, 21.0 g of TEA in methylene chloride and 6.0 liters of water. While the mixture is being stirred, 1165.0 g of a 93:7 isophthaloyl chloride:terephthaloyl chloride mixture dissolved in methylene chloride is added to the vessel. The total volume of methylene chloride in the vessel is 11 liters. During the addition of the diacid chloride mixture to the vessel, the pH is maintained between 8 and 10 by the addition of sodium hydroxide.

After the diacid chloride mixture is added, 240.0 g of phosgene is added to the vessel.

The organic layer is separated, washed with dilute hydrochloric acid, washed with water, steam precipitated and dried. The resulting polyester-polycarbonate-polysiloxane terpolymer has 5% by weight siloxane, 80 weight percent ester units based on the total ester and carbonate units in the terpolymer and a resin molecular weight of 31,000.

The resulting product is compounded and tested according to the procedures outlined in Example 1. The results are reported in Table 1.

EXAMPLE 3

A polyester-polycarbonate-polysiloxane terpolymer, in accordance with the present invention, is prepared by charging a vessel with 150.0 g of the siloxane from Preparation 1, 1772.0 g of SPA, 57.7 g of p-cumylphenol, 25.0 g of TEA in methylene chloride and 6.0 liters of water. While the mixture Is being stirred, 1165.0 g of a 50:50 isophthaloyl chloride:terephthaloyl chloride mixture dissolved in methylene chloride is added to the vessel. The total volume of methylene chloride in the vessel is 11 liters. During the addition of the diacid chloride mixture to the vessel, the pH is maintained between 8 and 10 by the addition of sodium hydroxide.

After the diacid chloride mixture is added, 240.0 g of phosgene is added to the vessel.

The organic layer is separated, washed with dilute hydrochloric acid, washed with water, steam precipitated and dried. The resulting polyester-polycarbonate-polysiloxane block copolymer has 5% by weight siloxane, 80 weight percent ester units based on the total ester and carbonate units in the terpolymer and a resin molecular weight of 31,500.

The resulting product is compounded and tested according to the procedures outlined in Example 1. The results are reported in Table 1.

EXAMPLE 4

A polyester-polycarbonate-polysiloxane block terpolymer, in accordance with the present invention, is prepared by charging a vessel with 150.0 g of the siloxane from Preparation 1, 1772.0 g of BPA, 57.7 g of p-cumylphenol, 25.0 g of TEA in methylene chloride and 6.0 liters of water. While the mixture is being stirred, 1165.0 g of a 50:50 isophthaloyl chloride:terephthaloyl chloride mixture dissolved in methylene chloride is added to the vessel. The total volume of methylene chloride in the vessel is 11 liters. During the addition of the diacid chloride mixture to the vessel, the pH is maintained between 8 and 10 by the addition of sodium hydroxide.

After the diacid chloride mixture is added, 240.0 g of phosgene is added to the vessel.

The organic layer is separated, washed with dilute hydrochloric acid, washed with water, steam precipitated and dried. The resulting polyester-polycarbonate-polysiloxane block copolymer has 5% by weight siloxane, 80 weight percent ester units based on the total aster and carbonate units in the terpolymer and a resin molecular weight of 33,400.

The resulting product is compounded and tested according to the procedures outlined in Example 1. The results are reported in Table 1.

EXAMPLE 5

A polyester-polycarbonate-polysiloxane terpolymer, in accordance with the present invention, is prepared by charging a vessel with 150.0 g of the siloxane from Preparation 1, 1772.0 g of BPA, 57.7 g of p-cumylphenol, 25.0 g of TEA in methylene chloride and 6.0 liters of water. While the mixture is being stirred, 1165.0 g of a 50:50 isophthaloyl chloride:terephthaloyl chloride mixture dissolved in methylene chloride is added to the vessel. The total volume of methylene chloride in the vessel is 11 liters. During the addition of the diacid chloride mixture to the vessel, the pH is maintained between 8 and 10 by the addition of sodium hydroxide.

After the diacid chloride mixture is added, 240.0 g of phosgene is added to the vessel.

The organic layer is separated, washed with dilute hydrochloric acid, washed with water, steam precipitated and dried. The resulting polyester-polycarbonate-polysiloxane block copolymer has 5% by weight siloxane, 80 weight percent ester units based on the total ester and carbonate units in the terpolymer and a resin molecular weight of 30,400.

The resulting product is compounded and tested according to the procedures outlined in Example 1. The results are reported in Table 1.

EXAMPLE 6

A polyester-polycarbonate-polysiloxane block terpolymer, in accordance with the present invention, is prepared by charging a vessel with 158.0 g of the siloxane from Preparation 1, 2125.9 g of BPA, 69.2 g of p-cumylphenol, 25.0 g of TEA in methylene chloride and 6.0 liters of water. While the mixture is being stirred, 694.4 g of a terephthaloyl chloride dissolved in methylene chloride is added to the vessel. The total volume of methylene chloride in the vessel is 12 liters. During the addition of the diacid chloride to the vessel, the pH is maintained between 8 and 10 by the addition of sodium hydroxide.

After the diacid chloride is added, 684.0 g of phosgene is added to the vessel.

The organic layer is separated, washed with dilute hydrochloric acid, washed with water, steam precipitated and dried. The resulting polyester-polycarbonate-polysiloxane block copolymer has 5% by weight siloxane, 45 weight percent ester units based on the total ester and carbonate units in the terpolymer and a resin molecular weight of 30,800.

The resulting product is compounded and tested according to the procedures outlined in Example 1. The results are reported in Table 1.

EXAMPLE 7

A polyester-polycarbonate-polysiloxane block terpolymer, in accordance with the present invention, is prepared by charging a vessel with 158.0 g of the siloxane from Preparation 1, 2125.9 g of BPA, 69.2 g of p-cumylphenol, 25.0 g of TEA in methylene chloride and 6.0 liters of water. While the mixture is being stirred, 694.4 g of a terephthaloyl chloride dissolved in methylene chloride is added to the vessel. The total volume of methylene chloride in the vessel is 12 liters. During the addition of the diacid chloride to the vessel, the pH is maintained between 8 and 10 by the addition of sodium hydroxide.

After the diacid chloride is added, 684.0 g of phosgene is added to the vessel.

The organic layer is separated, washed with dilute hydrochloric acid, washed with water, steam precipitated and dried. The resulting polyester-polycarbonate-polysiloxane block copolymer has 5% by weight siloxane, 45 weight percent ester units based on the total ester and carbonate units in the terpolymer and a resin molecular weight of 30,400.

The resulting product is compounded and tested according to the procedures outlined in Example 1. The results are reported in Table 1.

COMPARATIVE EXAMPLE 1

A polyester-polycarbonate copolymer, not in accordance with the present invention, is prepared by charging a vessel with 1367.9 g of BPA, 48.3 g of p-cumylphenol, 16.7 g of TEA in methylene chloride and 5.0 liters of water. While the mixture is being stirred, 929.0 g of a 93:7 isophthaloyl chloride:terephthaloyl chloride mixture dissolved in methylene chloride is added to the vessel. The total volume of methylene chloride in the vessel is 11 liters. During the addition of the diacid chloride mixture to the vessel, the pH is maintained between 8 and 10 by the addition of sodium hydroxide.

After the diacid chloride mixture is added, 200.0 g of phosgene is added to the vessel.

COMPARATIVE EXAMPLE 2

A polyester-polycarbonate copolymer, not in accordance with the present invention, is prepared by charging a vessel with 1367.9 g of BPA, 48.3 g of p-cumylphenol, 16.7 g of TEA in methylene chloride and 5.0 liters of water. While the mixture is being stirred, 929.0 g of a 93:7 isophthaloyl chloride:terephthaloyl chloride mixture dissolved in methylene chloride is added to the vessel. The total volume of methylene chloride in the vessel is 11 liters. During the addition of the diacid chloride mixture to the vessel, the pH is maintained between 8 and 10 by the addition of sodium hydroxide.

After the diacid chloride mixture is added, 200.0 g of phosgene is added to the vessel.

The organic layer is separated, washed with dilute hydrochloric acid, washed with water, steam precipitated and dried. The resulting polyester-polycarbonate copolymer has 0% by weight siloxane, 80 weight percent ester units based on the total ester and polycarbonate units in the copolymer and a resin molecular weight of 28,900.

The resulting product is compounded and tested according to the procedures outlined in Example 1. The results are reported in Table 1.

TABLE 1

| EXAMPLE | 1 | 2 | 3 | 4 | 5 | 6 | 7 | 1* | 2* |
|---|---|---|---|---|---|---|---|---|---|
| Resin MW | 28,700 | 31,000 | 31,500 | 33,400 | 30,400 | 30,800 | 30,400 | 28,800 | 28,900 |
| Melt Viscosity 100 sec$^{-1}$ | — | — | 1,400 | 1,300 | 850 | 1,100 | 990 | 480 | — |
| Melt Viscosity 1000 sec$^{-2}$ | — | — | 744 | 650 | 410 | 470 | 440 | 510 | — |
| HDT | 291° F. | 306° F. | — | 305° F. | 313° F. | 293° F. | 291° F. | 311° F. | 317° F. |
| 125 mil Notched IZOD | | | | | | | | | |
| RT | 8.9 | 8.3 | 5.8 | 5.3 | 5.7 | 7.5 | 8.1 | 8.5 | 8.4 |
| 0° C. | 8.3 | 7.2 | 5.7 | 5.5 | 5.8 | 7.4 | 8.0 | 7.7 | |
| −10° C. | 7.9 | 7.2 | 5.3 | 5.7 | 5.4 | 6.5 | 6.9 | 3.6 | |
| −20° C. | 6.5 | 6.0 | | | | 6.3 | 7.0 | | 1.4 |
| −30° C. | | | | | | 6.4 | 6.7 | | |
| −40° C. | 5.2 | 4.8 | | | | | | | |
| 250 mil Notched IZOD | | | | | | | | | |
| RT | 5.6 | 5.2 | | | | | | | 3.0 |

*Comparative Examples with 0% siloxane
RT-room temperature
HDT-heat of distortion temperature at 264 PSI
The melt viscosities are apparent melt viscosities at 350° C. in pascal seconds at the given apparent shear rate.

The organic layer is separated, washed with dilute hydrochloric acid, washed with water, steam precipitated and dried. The resulting polyester-polycarbonate copolymer has 0% by weight siloxane, 80 weight percent ester units based on the total ester and carbonate units in the copolymer and a resin molecular weight of 28,800.

The resulting product is compounded and tested according to the procedures outlined in Example 1. The results are reported in Table 1.

The results reported in Table 1, show that polyester-polycarbonate-polysiloxane terpolymers prepared in accordance with the present invention, Examples 1–7, exhibit non-Newtonian melt viscosities whereas conventional polyester-polycarbonate copolymers, Comparative Examples 1 and 2, exhibit Newtonian melt viscosities.

Furthermore, the results in Table 1 indicate that the melt viscosity of polyester-polycarbonate-polysiloxane terpolymers, Example 1–7, decreases by approximately 50% at high shear rates, whereas the melt viscosity of polyester-polycarbonate copolymer, without polysiloxane units, Comparative Examples 1–2, is almost constant with the shear rate. The decrease in melt viscosity at high shear rates allows the present invention to be used in injection molding processes of parts that are normally difficult to fill.

The results reported in Table 1 also show that polyester-polycarbonate-polysiloxane terpolymers prepared in accordance with the present invention, Examples 1–7, have better low temperature ductility and thick section impact than polyester-polycarbonate copolymers without polysiloxane blocks, Comparative Examples 1–2. The results specifically show that polyester-polycarbonate-polysiloxane terpolymers prepared in accordance with the present invention, Examples 1–7, have good ductility down to about −30° C., whereas polyester-polycarbonate copolymers without polysiloxane blocks, Comparative Examples 1–2, lose half their impact strength by −10° C.

The above mentioned patents, publications, and test methods are incorporated herein by reference.

Many variations in the present invention will suggest themselves to those skilled in this art in light of the above, detailed description. For example, instead of a terpolymer containing 5 weight percent of polysiloxane segments, one containing 45 weight percent can be used. Instead of a polysiloxane segment with an average degree of polymerization of 49 siloxane units, the average degree of polymerization could be varied from 10 to 120. In addition, two siloxane blocks of different degrees of polymerization could be mixed and used. Instead of iso- and terephthaloyldichloride, there can be used 2-6-naphthaloyl dibromide. Instead of cumyl phenol as a molecular weight modifier, phenol can be used. All such obvious modifications are within the full intended scope of the appended claims.

What is claimed is:

1. A thermoplastic terpolymer, which comprises:

(a) about 1 to about 50 weight percent of a repeating or recurring polysiloxane unit, based on the total weight of the terpolymer, of the formula:

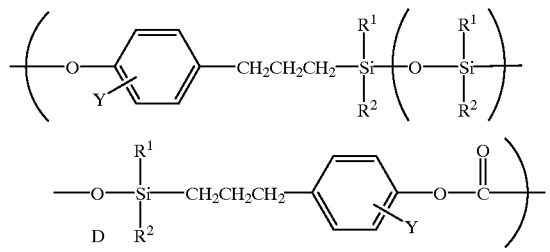

where $R^1$ and $R^2$ are each independently selected from hydrogen, hydrocarbyl, or halogen-substituted hydrocarbyl; D is an integer of from about 10 to about 120; and Y is hydrogen, alkyl or alkoxy; and (b) about 99 to about 50% by weight of the terpolymer of polycarbonate segments and aromatic polyester segments consisting essentially of from about 80 to about 10% by weight, relative to the total weight of the carbonate and aromatic ester segments in the terpolymer, of polycarbonate units of the formula:

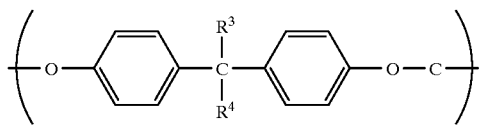

where $R^3$ and $R^4$ are each selected from hydrogen, hydrocarbyl or halogen-substituted hydrocarbyl; and from 20 to 90% by weight, relative to the total weight of the carbonate and aromatic ester segments in the terpolymer, of aromatic diester units of the formula:

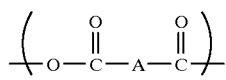

where A is phenylene.

2. The terpolymer of claim 1 wherein $R^1$ and $R^2$ are methyl.

3. The terpolymer of claim 1 wherein $R^3$ and $R^4$ are methyl.

4. The terpolymer of claim 1 wherein D is about 40–60.

5. The terpolymer of claim 1 wherein D is about 50.

6. The terpolymer of claim 1 wherein Y is methoxy.

7. The terpolymer of claim 1 wherein the weight percentage of the aromatic polyester segments and polycarbonate segments is from about 92 to about 96% and the weight percentage of the polysiloxane segments is from about 8 to about 4%.

8. A process for the production of a terpolymer which comprises introducing phosgene into a stirred two phase mixture comprising:

(1) a siloxane, terminated by phenolic hydroxyls, of the structure:

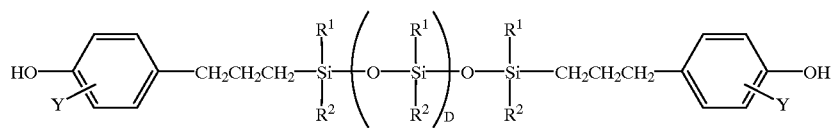

where $R^1$ and $R^2$ are selected from hydrogen, hydrocarbyl or halogen-substituted hydrocarbyl; where D is an integer of from about 10 to about 120; and Y is selected from hydrogen, hydrocarbyl, halogen-substituted hydrocarbyl and alkoxy, (2) a bisphenol, of the structure:

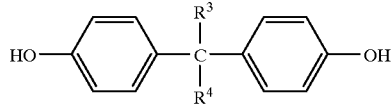

where $R^3$ and $R^4$ are selected from hydrogen, hydrocarbyl and halogen-substituted hydrocarbyl; and (3) an aromatic dicarboxylic acid halide having the structure

where A is phenylene and X is chloro or bromo, in the presence of sufficient aqueous alkali to maintain an alkaline pH and in the presence of a substantially water-immiscible solvent; and in the presence of (4) an effective molecular modifying amount of a monohydric phenol.

9. The process of claim 8 wherein said monohydric phenol is present at about 0.5 to 5.0 percent by weight of the bisphenol (V).

10. The process of claim 9 wherein D is from 40 to 60.

11. The process of claim 9 wherein $R^1$, $R^2$, $R^3$ and $R^4$ are methyl and Y is methoxy.

12. A thermoplastic terpolymer, which consists essentially of:

(a) about 4 to about 8% by weight of a repeating or recurring polysiloxane unit, based on the total weight of the terpolymer, of the formula:

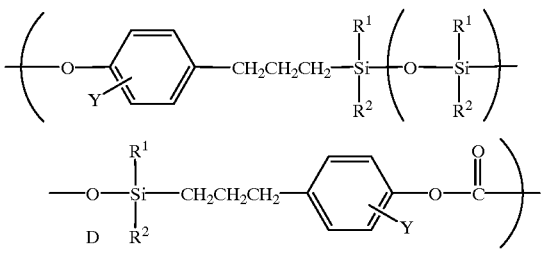

where $R^1$ and $R^2$ are each independently selected from hydrogen, hydrocarbyl, or halogen-substituted hydrocarbyl; D is an integer of from about 10 to about 120; and Y is hydrogen, alkyl or alkoxy; and (b) about 96 to about 92% by weight of the terpolymer of a polycarbonate segments and aromatic polyester segments consisting essentially of from about 80 to about 10% by weight, relative to the total weight of the carbonate and aromatic ester segments in the terpolymer, of polycarbonate units of the formula:

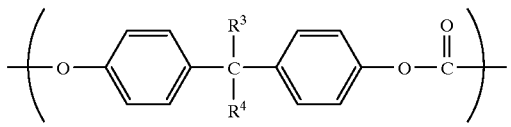

where $R^3$ and $R^4$ are each selected from hydrogen, hydrocarbyl or halogen-substituted hydrocarbyl; and from 20 to 90% by weight, relative to the total weight of the carbonate and aromatic ester segments in the terpolymer, of aromatic diester units of the formula:

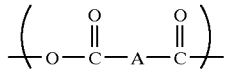

where A is phenylene.

* * * * *